United States Patent

[19]

Deter

[11] Patent Number: 6,025,885
[45] Date of Patent: Feb. 15, 2000

[54] PROCESS FOR COLOR TRANSFORMATION AND A COLOR VIDEO SYSTEM

[75] Inventor: Christhard Deter, Gera, Germany

[73] Assignee: LDT-GmbH & Co. Laser-Display-Technologie KG, Gera, Germany

[21] Appl. No.: 08/718,358

[22] PCT Filed: Jan. 30, 1996

[86] PCT No.: PCT/EP96/00378

§ 371 Date: Oct. 3, 1996

§ 102(e) Date: Oct. 3, 1996

[87] PCT Pub. No.: WO96/26613

PCT Pub. Date: Aug. 29, 1996

[30] Foreign Application Priority Data

Feb. 24, 1995 [DE] Germany ............ 195 06 595

[51] Int. Cl.[7] .......... H04N 9/67; H04N 9/68; G09G 5/04; G03F 3/08
[52] U.S. Cl. ........... 348/661; 348/660; 348/659; 348/646; 345/430; 345/431; 345/153; 358/518; 358/520; 358/519; 358/521
[58] Field of Search .......... 348/660, 659, 348/645, 646, 647, 649, 651; 358/518, 520, 519, 521, 522, 523; 345/430, 431, 153

[56] References Cited

U.S. PATENT DOCUMENTS

| | | | |
|---|---|---|---|
| 4,189,742 | 2/1980 | Klopsch | 358/76 |
| 4,285,009 | 8/1981 | Klopsch | 358/76 |
| 4,409,614 | 10/1983 | Eichler et al. | 358/76 |
| 4,605,954 | 8/1986 | Bestenreiner et al. | 348/645 |
| 4,679,072 | 7/1987 | Takayama | 348/659 |
| 4,812,902 | 3/1989 | Fuchsberger | 348/645 |
| 5,239,370 | 8/1993 | Yamaguchi | 358/518 |
| 5,402,253 | 3/1995 | Seki | 358/518 |
| 5,418,575 | 5/1995 | Kaneko et al. | 348/645 |
| 5,450,217 | 9/1995 | Eschbach et al. | 358/520 |
| 5,517,335 | 5/1996 | Shu | 358/520 |
| 5,563,726 | 10/1996 | Suzuki et al. | 358/518 |

FOREIGN PATENT DOCUMENTS

| | | |
|---|---|---|
| 2 318 804 | 10/1974 | Germany . |
| 43 06 797 | 5/1994 | Germany . |

*Primary Examiner*—John K. Peng
*Assistant Examiner*—Paulos Natnael
*Attorney, Agent, or Firm*—McAulay Nissen Goldberg Kiel & Hand, LLP

[57] ABSTRACT

In a process for color transformation from the input-side primaries (R, G, B) to image-side primaries (R", G", B") with a greater color stimulus specification region than that given by the input-side primaries (R, G, B), a color transformation is carried out by converting the components of a color vector from the input-side primaries to fictitious primaries (R', G', B') so that the color stimulus specification of the color vector is changed, and transforming of the converted components of the color vector from the fictitious primaries (R', G', B') to the image-side primaries (R", G", B") for generating image-side components of the color vector, wherein the image-side color stimulus specifications produced in this way have the same hue and the same saturation as the transformed color stimulus specification in the fictitious primary system (R', G', B').

A color video system for carrying out the process accordingly contains a circuit (15) id for converting the signals to the fictitious primary system (R', G', B') and a matrix circuit (14) for transforming from the fictitious primary system to the image-side primary system (R", G", B").

12 Claims, 5 Drawing Sheets

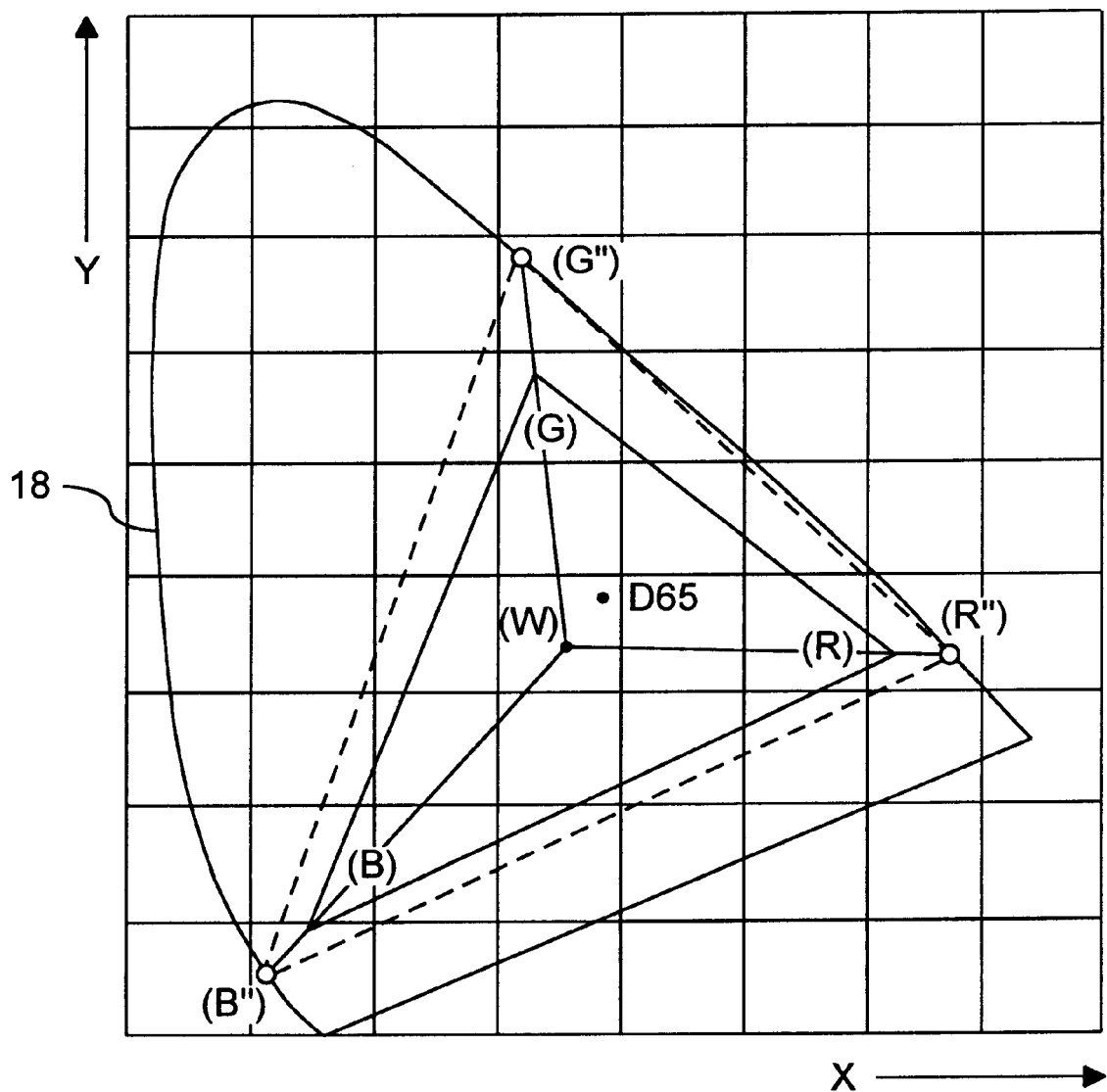
F I G. 3

PROCESS FOR COLOR TRANSFORMATION AND A COLOR VIDEO SYSTEM

BACKGROUND OF THE INVENTION

1. Field of the Invention

The invention is directed to a process for the color transformation of the color stimulus specifications of image points of a color video system in which every color stimulus specification can be represented by components of a color vector within a color stimulus specification region which contains an achromatic point and is determined by input-side primaries of a signal source and in which image-side primaries whose color stimulus specification region likewise contains the achromatic point are used for displaying the image points, wherein at least one color stimulus specification of this color stimulus specification region lies outside the color stimulus specification region of the input-side primaries and a transformation is carried out for generating components referred to image-side primaries (R", G", B") and image-side components of negative intensity are suppressed at their occurrence. The invention is further directed to a color video system for showing color image points with an input circuit for generating and/or taking over color value signals associated with input-side primaries for a color stimulus specification region containing an achromatic point, with an image forming device for generating image points of a color video picture based on image-side primaries whose color stimulus specification region contains the achromatic point and at least one color stimulus specification outside the color stimulus specification region of the input-side primaries, and a matrix circuit which is connected between the input circuit and the image forming device and which transforms input-side color value signals into image-side color value signals for the image points of the image forming device.

2. Description of the Related Art

Color transformations in television reception for adapting transmitted color value signals to the phosphors of picture tubes are known, for example, from the book by Heinwig Lang, "Farbmetrik und Farbfernsehen [Colorimetry and Color Television]", R. Oldenbourg Verlag, Munich, 1978. The matrix transformations in the color space indicated in this reference can be used, for example, when a video picture with primaries based on the FCC standard is transmitted for color-correct display on a picture tube provided with phosphors based on the EBU standard. The FCC standard and EBU standard differ substantially in the green region so that color matching is required for color-correct display.

While the color stimulus specification regions do not differ from one another very much in this type of application, a matrix transformation is essential in laser projection systems because the wavelengths are monochromatic and the associated color vectors in the CIE diagram lie on the spectral curve plot. Projection systems of this kind are known from "Large Screen Laser Color TV Projector", Yahiko Yamada et al., Proceedings of 6th International Quantum Electronics, 1970, and from DE-PS 43 06 797. This patent is primarily concerned with correct color stimulus specification reproduction of a television picture transmitted, e.g., in EBU standard with lasers whose wavelengths determine the image-side primaries.

As in the first commercially available television receivers with picture tubes, such color video systems could also include the possibility of adjusting the signal level of the red, green and blue signals so that the color picture can be changed slightly to suit the taste of the user. However, this covers only the region of color hues and color saturations which are provided by the input-side primaries.

In the area of advertising and marketing, for example, it would also be desirable to have color video systems which could show color hues different from or colors with fuller saturation than those determined by the range of color stimulus specifications on the input side. In the presently known state of the art, for example, advertising videos could be played on one of the laser projection devices mentioned above, which videos must be recorded with special cameras or be processed subsequently so that a greater color stimulus specification region is accessible. Further, it would then be necessary to convert the laser projection devices in order to make available the greater color stimulus specification region for this application. Such steps are very costly because of the special devices required. As a result, even in the field of advertising where large amounts of money are generally available, this possibility has not been made use of.

OBJECT AND SUMMARY OF THE INVENTION

The primary invention is to provide a process and a corresponding color video system which allows a more economical use of a larger accessible color stimulus specification region than that given by input-side color value signals for displaying colors in a video system.

According to the invention, this object is met in a process of the type mentioned above by setting up fictitious primaries whose color stimulus specification region contains at least one color stimulus specification outside the color stimulus specification region of the input-side primaries and within the color stimulus specification region of the image-side primaries, and the transformation is carried out by means of the following steps:

conversion of the components of the color vector from input-side primaries to fictitious primaries such that the color stimulus specification of at least one input-side primary is shifted to the at least one color stimulus specification outside the color stimulus specification region of the input-side primaries, and transformation of the converted components of the color vector from the fictitious primaries to the image-side primaries for generating image-side components of a color vector, wherein the image-side color stimulus specifications produced in this way have the same hue and the same saturation as the transformed color stimulus specification in the fictitious primary system.

The invention uses a fictitious primary system. This permits a defined conversion of the input-side color stimulus specifications into a color stimulus specification system with other hues and other saturations. The color stimulus specifications generated in the fictitious primary system are matched with the image-side primaries for display only after further transformation.

A method of carrying out a transformation of this kind is already known from the prior art cited in the introduction and has already been implemented, e.g., in laser projection systems. According to the invention, however, it must be taken into account that the transformation is directed not at the picture screen phosphors but rather at the fictitious primaries as input values.

For improved presentation of colors in advertising with a laser projection device of this kind, the process can be realized, for instance, in that the conversion is carried out at the same time as the processing of the advertising film by means of computers as is often done today. For this purpose, for example, all colors would be converted by the computer program in accordance with a matrix transform from the primaries with which the advertising film was recorded to the input-side primaries required in a laser projection system and a conversion of the image points in accordance with the process according to the invention is effected only when colors of greater saturation are to be used in the fictitious primary system when processing for determined products or for a scene segment. A greater degree of freedom is then advantageously provided by means of new hues for the frequently used advertising technique of alienation.

This example shows above all that technical cost is not a significant factor in the process according to the invention compared with a solution according to the prior art which must use special cameras, special video equipment, etc.

The process according to the invention also allows the same color value signals to be used for different receivers having different systems of primaries for displaying color. When, as is anticipated for the new HDTV television standard, color stimulus specifications are recorded on the transmission end in a greater range of hues and processed for standard television sets whose producible color stimulus specification region is determined by the picture screen phosphors, it is possible, for instance, to accommodate information on a sideband which notifies a receiver device with a greater range of producible color stimulus specifications on the image side when an image point is presented by a color in a fictitious primary system determined by a standard. The conversion and transformation can then be effected in this receiver device in a corresponding manner.

This example shows that the invention not only solves its stated object, but also unexpectedly enriches the technology in that it even permits television transmission for different television sets with different standards.

The process can accordingly be used in multiple ways. In another possible application, the choice of the fictitious primary system is to a great extent left up to the user of the video system, e.g., via a remote control, so that the user can adjust an increased saturation or a slight hue distortion if desired.

However, in order that the user of a television always obtains a high-quality television picture, it is provided according to an advantageous further development of the invention that the color stimulus specification of the achromatic point is not affected by the conversion into components of a color vector in the fictitious primary system.

With respect to achromatic image points, that is, white or gray, in particular, a very free choice of fictitious primaries could lead to color-distorted pictures. Such color distortion is prevented by restricting the freedom of choice of fictitious primary system, since a white present on the input side is also displayed as the same white. This possibility of restriction distinguishes the process according to the invention from the choice of different amplitudes of color value signals which was standard in the early days of color television and which could result in color distortion which manifested itself unpleasantly chiefly in whites.

As will become clear from the embodiment examples, there are various possibilities for converting into the fictitious primary system. In a preferable further development of the invention, the conversion of the components of the color vector from the input-side primary system to the fictitious primary system is carried out by means of a matrix transformation of the components of the color vector. This transformation can be carried out economically in a manner known from the prior art. Moreover, this transformation is linear. This ensures a simultaneous change in hue and increase in saturation which is not guaranteed in all possible conversions, e.g., when carried out by means of extremely nonlinear functions.

The use of a matrix for conversion also enables a very simple technical realization of the process according to a preferred further development of the invention in that only one individual matrix transformation is carried out with a matrix which is given by the product of the matrix used for conversion and a matrix for transformation from the fictitious primary system (R', G', B') to the image-side primary system (R", G", B").

The process according to the further developments of the invention accordingly requires only one matrix transformation in all. As was already mentioned above, a matrix transformation in video systems with an enlarged range of color stimulus specifications is advisably used on a standard basis for color-faithful imaging of input-side color value signals according to the prior art. Therefore, according to this further development, expenditure is nonexistent because, in comparison to the transformations according to the prior art, implementation of the process consists only in the dimensioning of the matrix transformation according to the further development in accordance with the inventive teaching.

In another preferred further development of the invention, the fictitious primaries are fixed at color stimulus specifications which have the same hue as the input-side primaries but an increased saturation for at least one of the input-side primaries. More substantial color distortions can also be avoided in this way and the user of a video device making use of the process according to the invention can enjoy colors with fuller saturation without the quality of the television picture being affected by incorrectly displayed hues.

In a color video system of the type mentioned in the beginning, the stated object is met in that a circuit is provided for converting color value signals referred to the input-side primaries into color value signals referred to fictitious primaries whose color stimulus specification region contains the at least one color stimulus specification lying outside the color stimulus specification region of the input-side primaries and within the color stimulus specification region of the image-side primaries, wherein the color value signals of at least one input-side primary can be converted by means of the circuit to color value signals for the at least one color stimulus specification lying outside the color stimulus specification region of the input-side primaries, and the matrix circuit is designed for the transformation of the color value signals referred to the fictitious primaries into the image-side primaries.

The color video system according to the invention has all of the circuit parts necessary for carrying out the process. In particular, it is characterized by an especially simple construction. A matrix circuit is advantageously already contained in a color video system with primaries for display which differ from the input signals for color-correct imaging of image points. According to the invention, this matrix circuit need only be designed with a view to a transformation of color value signals referred to fictitious primaries. Thus, in this respect, a color video system according to the invention is no more costly than a color video system according to the prior art. The color video system according to the invention only requires an additional circuit for converting. As will be seen from the embodiment examples shown hereinafter, the cost of this additional circuit is low or even nonexistent with a suitable choice of conversion.

In a preferred further development, color-distorted pictures are prevented in that the circuit for converting the input-side color value signals to the fictitious primaries is so designed that a color stimulus specification of the achromatic point can be represented on the image side by the input-side color stimulus specification.

More substantial unexpected color distortions which could occur in the case of an extremely nonlinear circuit for converting the color value signals are avoided in a conversion of the color value signals via a matrix transformation. This type of conversion is realized in a preferable further development of the invention in that the circuit for conversion contains another matrix circuit for an additional matrix transformation.

By separating the conversion from the subsequent color stimulus-correct transformation, this further development also enables different adjustments, e.g., selected by the user, for different ways of carrying out the process since a separate circuit for the conversion also makes it possible to switch between various desired conditions if different circuits can be optionally connected prior to the matrix circuit.

In a preferred further development, additional circuit design effort is entirely eliminated compared with a television set according to the prior art which does not make use of the process according to the invention, since the matrix circuit in the latter contains the circuit for the conversion in that it is designed for a matrix transformation with an individual transformation matrix which is the product of the matrix for the matrix transformation of the conversion and the matrix for the transformation of the color value signals from the fictitious primary system to the image-side primaries.

In another preferable further development of the invention, the circuit for the conversion can be controlled for different selectable fictitious primaries.

As a result of this controllability, the user of the color video system according to the invention can be provided, for instance, with the option to watch the picture as determined by the input-side transmitted color value signals or to make use of different possible saturation levels, for example. This choice not only increases convenience, but also enables standardization, since it is not required to have different video systems for watching pictures corresponding to the input-side television standard on the one hand and to use the video system to display color stimulus specifications not otherwise available, e.g., in the example of advertisement mentioned above, on the other hand. This standardization also advantageously reduces cost.

In a preferred further development of the color video system according to the invention, the circuit has resistors which are controllable for different selectable fictitious primaries, which resistors can be changed by control voltages which can be applied to the circuit or currents which can be passed into the circuit.

Compared with solutions which switch between different conversion circuits as requirements demand, this further development is economical in that, e.g., the same operational amplifiers can be used in the circuit. Resistors, even those with close tolerances, are available at low cost so that costs always remain at an economical level even in case of exact requirements with respect to implementation of the process.

In a preferred further development suppressor circuits for negative image-side color value signals are provided, these suppressor circuits containing a voltage divider formed of a diode and a resistor for each color value signal. The voltage divider is connected on the diode side to a potential compensating for the threshold voltages of the diodes.

The described color video system would limit the possible range of application of the process without suppressor circuits, since, in reality, negative color value signals cannot be displayed by light intensity. If suppressor circuits are used, this aspect need not be considered further.

The aforementioned construction of the suppressor circuits with a resistor and a diode also represents only minor effort. With a suitable selection of the resistor, it even enables a logarithmic cutoff so that substantial hue changes are still detectable at the limits of the producible color stimulus specification region at which negative color value signals can otherwise occur. Thus, the image quality is advantageously increased by means of these features of the further development.

In the following, the invention is explained more fully by way of example with reference to the drawings.

BRIEF DESCRIPTION OF THE DRAWINGS

In the drawings

FIG. 3 shows a CIE diagram as in FIG. 2, but with laser wavelengths which allow the highest possible saturation with input-side primaries in the EBU standard;

DESCRIPTION OF THE PREFERRED EMBODIMENTS

Processes and devices in which saturation is increased are presented byway of example in the following embodiment examples. However, the process and the device can also be applied to other hue changes if the calculations which are shown by way of example are suitably transposed by a person knowledgeable in the area of color display. All calculations are presented in the nomenclature conventionally employed in colorimetry in which values in parentheses designate vectors and values without parentheses are scalar quantities or components of a color vector.

Figure 1:
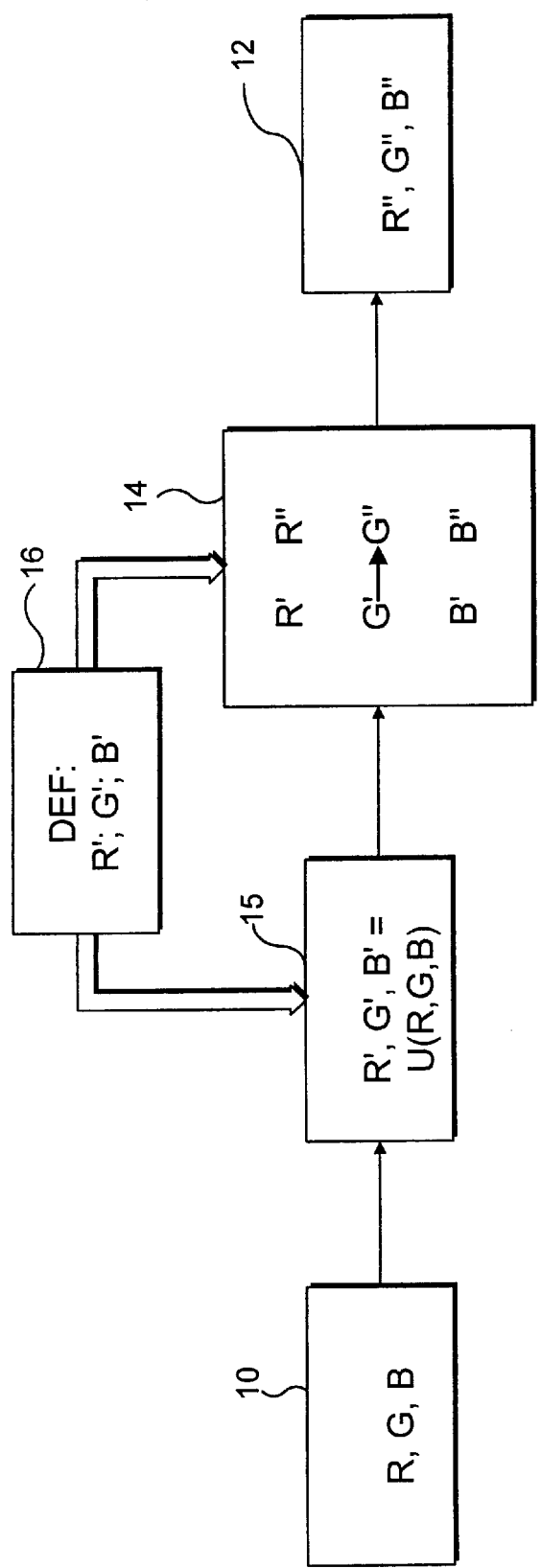
FIG. 1 shows a schematic diagram of a color video system for carrying out the process according to the invention.

FIG. 1 shows a color video system in which video signals are generated or taken over in an input circuit 10. These video signals are generally picture screen phosphors with the associated primaries (R), (G), (B), e.g., in accordance with the EBU or FCC color standard. In conventional video systems the corresponding color value signals for color control are transmitted to a picture tube serving as an image forming device. The commonly applied gamma preemphasis in a color video system has no effect on the colorimetrically linear relationship. A color-faithful imaging is only achieved when the picture tube corresponds to the same standard as the primaries (R), (G), (B) for the color value signals from the input circuit 10. More generally, when other primaries (R"), (G"), (B") are used for showing a color picture, the color value signals must be adapted to these primaries (R"), (G"), (B") of the image forming device.

FIG. 1 shows an image forming device 12 which reproduces the image in correct colors when color value signals according to other primaries (R"), (G"), (B") are fed into the image forming device 12. In the prior art, a matrix circuit 14 which transforms the color value signals of the primaries (R), (G), (B) from the input circuit 10 to the color value signals of the other primaries (R"), (G"), (B") is conventionally used for color-correct display. According to the invention, however, the transformation is effected not from the primary system (R), (G), (B) to another primary system (R", G", B"), but from fictitious primaries (R'), (G'), (B') in which there is a higher saturation of hues than is possible with the input-side primaries (R), (G), (B).

Further, in order to generate the input signals for the matrix circuit 14 a circuit 15 is provided for conversion in accordance with the inventive process which will be discussed more fully hereinafter with reference to FIGS. 2 and 3. Essentially, the circuit 15 generates colors with increased saturation with reference to the fictitious primaries (R'), (G') and (B'). The components of the matrix circuit 14 which determine the matrix, generally resistors, are dimensioned in this case in accordance with the fictitious primaries (R'), (G'), (B') rather than the input-side primaries (R), (G), (B) as in the prior art. In FIG. 1 a control circuit 16 controls the values of the resistors in the matrix circuit 14 which determine the coefficients are made possible via different fictitious primaries (R'), (G'), (B'). Suitable controllable resistors include thermistors which are heated by currents from the control circuit 16 or also resistors which are changeable magnetically, e.g., via the Hall effect, and are acted upon by a magnetic field proceeding from the control circuit 16. However, the values of the resistors can also be regulated digitally as will be explained hereinafter with reference to FIG. 4 and FIG. 5. By doing without the possibility of adjusting an increased color saturation, the control circuit 16 can also be dispensed with and the resistors in the matrix circuit 14 can be set corresponding to the fictitious primary system (R'), (G'), (B').

In the same way, the control circuit 16 is also connected to the circuit 15 for signal conversion. By means of this connection the signal transformation carried out in the circuit 15 can also be adapted to different fictitious primaries (R'), (G') and (B') resulting in different saturations depending on the choice of fictitious primaries. Thus, in the embodiment example in FIG. 1, different saturations can be adjusted via the control circuit 16.

In the embodiment example shown in FIG. 1, the control circuit 16 has been designed in such a way that, due to the fictitious primaries (R'), (G'), (B'), substantially only an increased saturation of color tones is achieved and hue distortions remain at a permissible level. It will be explained in more detail with reference to FIG. 2 how this can be accomplished.

Figure 2:
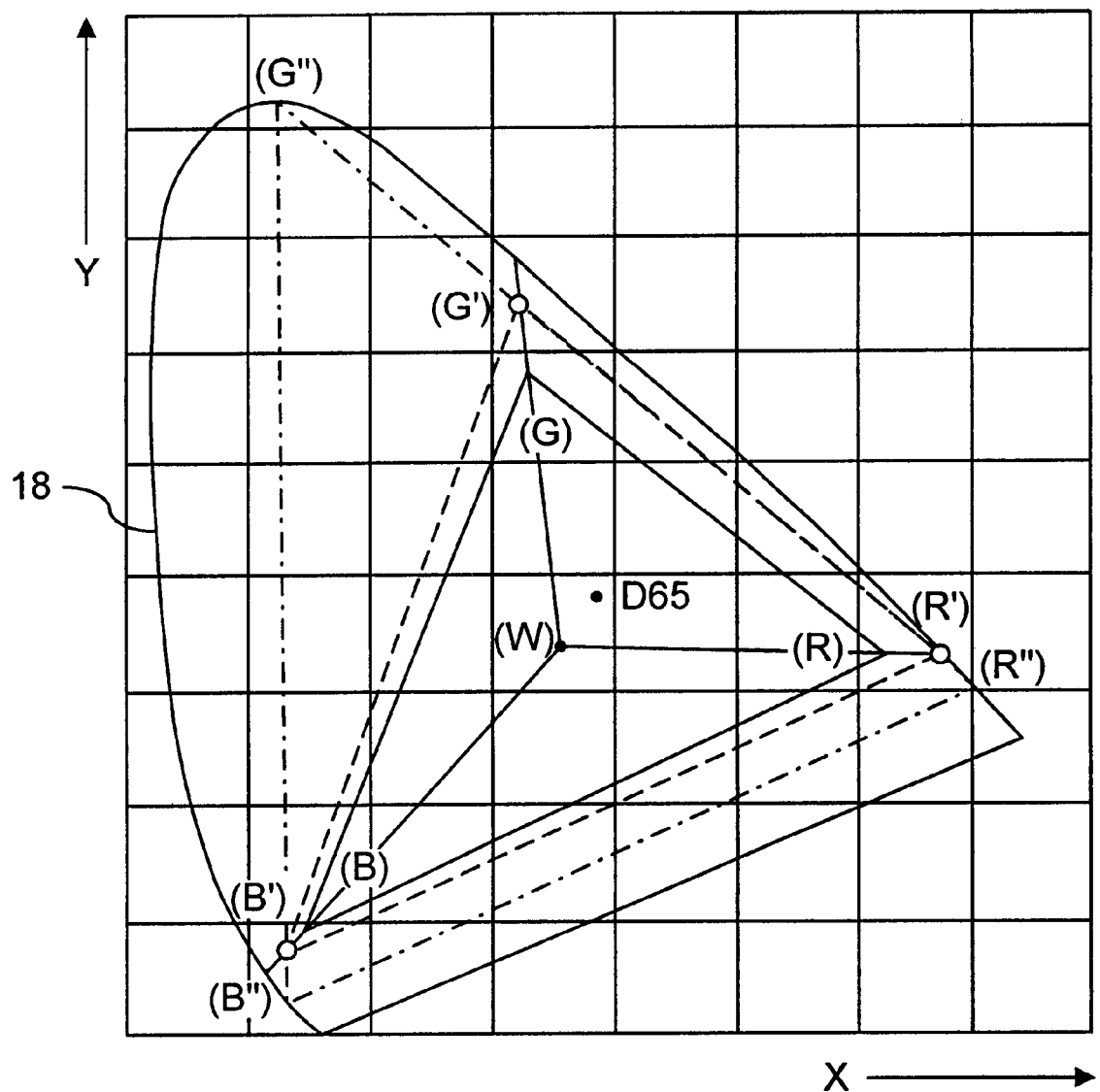
FIG. 2 shows a CIE diagram for EBU-standard phosphors as input-side primaries and laser wavelengths for the image-side primaries.

FIG. 2 shows a CIE diagram with the usual coordinates x and y which run from 0 to 1 for the different color stimulus specifications. A grid with intervals of 0, 1 for x and y is shown in FIG. 2. In addition, the conventional spectral plotted curve 18 is shown. In a laser video system the colors lie on this spectral curve 18 since lasers are monochromatic.

In the embodiment example in FIG. 1, lasers were used in the image forming device 12 for displaying the color of the image points. The wavelengths used for this purpose resulted in a system of primaries which is plotted on the spectral curve 18 in FIG. 2 by way of example with points (R"), (G") and (B"). The accessible color stimulus specification region lies within the triangle shown by the dashed line between the coordinates of points (R"), (G") and (B").

Further, the coordinates of the input-side primary system (R), (G), (B) corresponding to the EBU standard are characterized in FIG. 2 by corresponding points. The accessible color stimulus specification region in the input-side primary system (R), (G), (B) is given by the color triangle shown in solid lines.

In the CIE diagram shown in FIG. 2 the achromatic point (w) referred to in the following is plotted at coordinates x=⅓ and y=⅓. However, the following observations are not limited thereto and may also be referred to different standard light types, e.g., D65, whose achromatic point is likewise plotted in FIG. 2.

It will be seen from FIG. 2 that the color stimulus specification region given in the image-side primary system (R"), (G") and (B") is substantially greater than that given in the input-side primary system (R, G, B). However, this is not utilized in a color transformation according to the prior art.

Nevertheless, colors with fuller saturation are possible in the image forming device 12. This is illustrated by the straight connecting lines shown in FIG. 2 between the achromatic point (w) and the corner points of the color triangle associated with the input-side primaries (R), (G), (B). Colors of the same hue as those of the EBU phosphors, but with a different saturation, lie on these straight connecting lines.

In FIG. 2, the points at which the straight connecting lines intersect the spectral color curve 18 designate colors of maximum saturation. However, only those saturations that are designated in FIG. 2 by (R'), (G') and (B') and are given by the points at which the straight connecting lines intersect the sides of the color triangle for the image-side primaries (R"), (G") and (B") are available with the image forming device 12.

If the colors are realized, according to the invention, in the image-side primary system (R"), (G") and (B") not from the input-side primaries (R), (G), (B), but from a fictitious primary system which is fixed by these points (R'), (G') and (B') in the CIE diagram, colors of the same hue but with maximum saturation can be produced in the image forming device 12. This increase in saturation can also be optionally reduced when a fictitious primary system (R'), (G'), (B') is chosen whose coordinates in the CIE diagram likewise lie on the straight connecting lines but closer to the coordinate points for the EBU phosphors. Thus, an adjustable saturation is also possible by choosing the fictitious primaries (R'), (G'), (B') as was already taken into account by the control circuit 16 in FIG. 1.

The fullest possible saturation can be achieved when lasers having wavelengths which correspond through the intersecting points of the straight connecting lines with the spectral color curve 18 are used for the image forming device 12. An example of this is shown in the graph in FIG. 3. When compared with FIG. 2 it will be seen that the fictitious primary system in this case can be selected so as to be identical to the image-side primary system and the described transformation from the fictitious primaries (R'), (G'), (B') to the image-side primaries (R", G", B") is then reduced to a one-matrix so that a corresponding circuit for transformation can be dispensed with in a color video system.

In order to achieve the increased saturation, however, the input-side color value signals must be converted from the (R), (G), (B) primary system to the fictitious primaries (R'), (G'), (B') in such a way that a color stimulus specification at one of the coordinates indicated in FIG. 2 for the input-side primaries (R), (G), (B) is converted to the coordinate points of the fictitious primaries (R'), (G') and (B').

The simplest possibility for conversion consists in relating the input-side color value signals to the fictitious primaries (R'), (G'), (B'). The components of the color vectors in the (R'), (G'), (B') primary system are then identical to the components of the color vectors in the input-side primary system. Thus, the color value signals need not be changed. In so doing, however, the achromatic point is also changed by an optional choice and a color distortion of the produced image cannot always be ruled out.

For this reason, another conversion which leaves the achromatic point (w) unchanged was selected in the embodiment example of FIG. 1. Even with this secondary condition a number of possibilities for conversion can be defined for the color value signals. In particular, the color value signals are advantageously transformed from the input-side primary system to the fictitious primary system via a matrix transformation. The entire transformation from the input-side color value signals to the color value signals which can be used on the image side is given by an individual matrix that can be determined in a known manner and results as a product of the matrix for conversion and the matrix for the transformation from the fictitious primary system (R'), (G'), (B') to the image-side primary system (R"), (G"), (B"). Only one individual matrix circuit is needed in this case instead of the separate circuits 14 and 15 in FIG. 1. Further, a purely linear relationship results between the input-side color value signals and the image-side color value signals so that nonlinear saturation increases are excluded and a uniform saturation increase is ensured.

The matrix for conversion can be calculated in the following way: The coordinate values $x_R$, $y_R$, $x_G$, $y_G$, $x_B$, $y_B$ of the input-side primaries (R, G, B) and the coordinate values $x_R'$, $y_R'$, $x_G'$, $y_G'$, $x_B'$, $y_B'$ of the fictitious primaries (R'), (G'), (B') can be taken from a CIE diagram as shown in FIG. 2. In order to be represented in the standard colorimetric system the coordinate values must be supplemented by a third component z which is formed, by definition, for each primary by $$z_i = 1 - x_i - y_i,$$

where the subscript i stands for all colors of the primaries, whether fictitious or input-side primaries. The values x, y, z only show the direction of the vectors in the standard colorimetric system. The possibility of selecting the length of the vector is made use of in order to determine vectors for the fictitious primaries such that the achromatic point has the same white during the conversion by introducing scaling variables $S_R$, $S_G$, $S_B$.

The equation which says that the color vector of the achromatic point with components $r_u$, $g_u$, $b_u$ in the input-side primary system (R), (G), (B) and with components $r_u'$, $g_u'$, $b_u'$ in the fictitious primary system (R'), (G'), (B') remains unchanged is then given as follows in the standard colorimetric system:

$$r_u \begin{bmatrix} X_R \\ Y_R \\ Z_R \end{bmatrix} + g_u \begin{bmatrix} X_G \\ Y_G \\ Z_G \end{bmatrix} + b_u \begin{bmatrix} X_B \\ Y_B \\ Z_B \end{bmatrix} = r_u' S_R \begin{bmatrix} x_R' \\ y_R' \\ z_R' \end{bmatrix} + g_u' S_G \begin{bmatrix} x_G' \\ y_G' \\ z_G' \end{bmatrix} + b_u' S_B \begin{bmatrix} x_B' \\ y_B' \\ z_B' \end{bmatrix},$$

where the left brackets represent the color vectors of the input-side primaries in the standard colorimetric system.

The equation yields three conditional equations for the three scaling variables $S_R$, $S_G$, $S_B$ so that they can be unequivocally defined. With the values obtained thereby, the color vectors for the fictitious primaries (R'), (G') and (B') are unambiguously determined in the standard colorimetric system with the components $X_i$, $Y_i$, $Z_i$ by $$\begin{bmatrix} X_i' \\ Y_i' \\ Z_i' \end{bmatrix} = S_i \begin{bmatrix} x_i' \\ y_i' \\ z_i' \end{bmatrix},$$

where the subscript i again stands for colors R, G, B.

With the components obtained thereby, the following matrix can now be formed:

$$M' = \begin{bmatrix} X_R'; & X_G'; & X_B' \\ Y_R'; & Y_G'; & Y_B' \\ Z_R'; & Z_G'; & Z_B' \end{bmatrix}$$

which, together with matrix M of the components of the input-side primaries (R), (G), (B):

$$M = \begin{bmatrix} X_R; & X_G; & X_B \\ Y_R; & Y_G; & Y_B \\ Z_R; & Z_G; & Z_B \end{bmatrix},$$

gives the sought for matrix via the equation $M^{-1} M'$ for converting the color value signals of the input-side primary system (R), (G), (B) to the fictitious primary system (R'), (G'), (B').

If the fictitious primaries in the CIE diagram are determined by the coordinates indicated in the following table:

|      | x    | y    |
|------|------|------|
| (R') | 0.65 | 0.33 |
| (G') | 0.27 | 0.66 |
| (B') | 0.14 | 0.05 | and the input-side primaries are defined by the EBU standard and the achromatic point used for the equation above is equal to the white point with the coordinates $x=\frac{1}{3}$ and $y=\frac{1}{3}$, the following transformation matrix results, for example, from the indicated calculation:

$$\begin{bmatrix} 0.886889; & 0.091808; & 0.021303 \\ 0.008297; & 0.982542; & 0.009161 \\ 0.008560; & 0.058421; & 0.933019 \end{bmatrix}.$$

The coordinates indicated in the table can be realized with an image forming device whose lasers, which serve as light sources for showing the image points, have wavelengths of 647.1 nm for red, 514.5 nm for green and 457.9 nm for blue.

Another conversion which ignores the achromatic point or a white can be generated given the following in accordance with the graphs in FIGS. 2 and 3:

$$(F') - (w) = U[(F) - (w)],$$

where (F) is a color vector of the input-side primaries (R), (G) or (B), (F') is a color vector of the fictitious primaries (R'), (G') or (B'), and U is a function which changes (F) to (F') in the above statement. Function U can be freely selected to a great degree so that even nonlinear saturation increases can be achieved.

An embodiment example in accordance with this statement is described in the following with reference to FIGS. 4 to 6 in which it is shown, among other things, how a saturation increase which can be adjusted by the user can be carried out in a device according to the invention.

For example, the saturation is increased by a factor S when the fictitious primaries are selected according to the indicated statement as $$(R')-(w)=S[(R)-(w)]$$
$$(G')-(w)=S[(G)-(w)]$$
$$(B')-(w)=S[(B)-(w)],$$

where (w) is the color vector of a white which is left unchanged in the transformation. It should be noted that, compared with the preceding example with the matrix transformations shown therein, all vectors of the primary system are standardized at 1, which involves a simplification in the following description since standardization-dependent factors need not be taken into account.

A color vector (F)=r(R)+g(G)+b(B) with components r, g, b is changed, e.g., into a fictitious primary system (R'), (G'), (B') when the components remain the same after conversion. Thus, for the color vector for the saturated colors $$(F_{UM})=r'(R')+g'(G')+b'(B')$$

components r', g', b' in the fictitious primary system (R'), (G'), (B') are selected such that they are equal to components r, g, b of color vector (F). This can easily be verified by equating two of the components r, g, b with zero. The color vector given by the conversion is then represented according to the indicated choice of the fictitious primaries as $$(F_{UM})=r(R)+g(G)+b(B)-[S-1\;][r+g+b](w).$$

If the white which is likewise standardized to I is also represented by components $L_R$, $L_G$, $L_B$ in the input-side primary system as (w)=$L_R$(R)+$L_G$(G)+$L_B$(B), the following equation is given for the color vector $F_{UM}$ generated by conversion in the input-side primary system (R), (G), (B):

$$(F_{UM}) = \{r - [s-1][r+g+b]L_R\}(R) +$$
$$\{g - [s-1][r+g+b]L_G\}(G) +$$
$$\{b - [s-1][r+g+b]L_B\}(B).$$

It will be seen from the above that the color vector occurring by means of the conversion in the input-side primary system for S>1 can also have negative components, which shows that the conversion, as expected, can follow from the color stimulus specification region of the input-side primaries (R), (G), (B). As regards circuitry, negative color value signals can no longer cause problems since the following transformation from the fictitious primaries to the image-side primaries again produces a greater color stimulus specification region so that the color value signals which are then generated can again be transformed to positive and physically meaningful values.

A circuit 20 which simulates the above equation for color value signals in analog is used in the following embodiment example. In so doing, however, the saturation S is bracketed out as total gain:

$$(F_{UM})=S\;\{(F)-[1-1/S][r+g+b](w)\},$$

so that this can be realized as the same gain for all three components.

Figure 4:
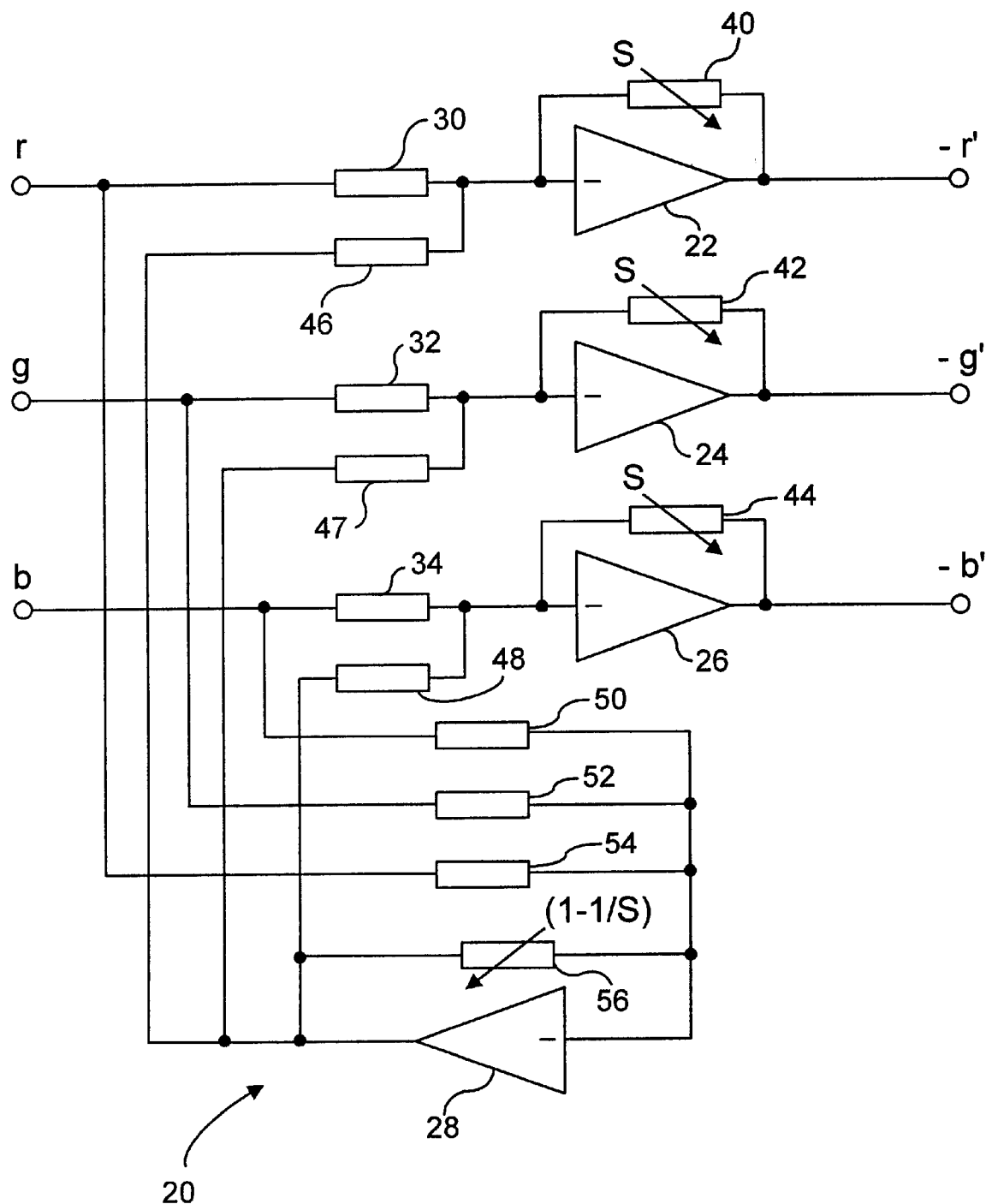
FIG. 4 shows a circuit for converting color value signals into a fictitious primary system with higher saturation.

FIG. 4 shows the circuit 20 for converting color value signals according to the indicated equation. It contains four operational amplifiers 22, 24, 26 and 28 as its essential components. Signals with color values r, g, b are applied to the inverting inputs of the operational amplifiers 22, 24 and 26 via resistors 30, 32 and 34. The operational amplifiers 22, 24 and 26 are negatively fed back with controllable resistors 40, 42 and 44. The respective resistance ratios of the resistance values of resistors 40, 42 and 44 and resistors 30, 32 and 34 determine the amplification factor by the operational amplifiers 22, 24 and 26. Resistors 30, 32, 34, 40, 42, 44 are so designed that an amplification factor S results in accordance with the desired saturation corresponding to the external control. However, a voltage value which, when suitably dimensioned, corresponds to the term [1−1/S](r+g+b) (w) is subtracted from the output voltages of the operational amplifiers 22, 24, 26 via resistors 46, 47, 48 and the operational amplifier 28. In so doing, the resistors 50, 52, 54 of identical value serve to form the sum of the color value signals r, g and b. The gain of the amplifier 28 which depends on the resistance value of a first controllable resistor 56 is designed for (1−1/S). The resistors 46, 47, 48 serve, accordingly, to attenuate components $L_R$, $L_G$ and $L_B$ of the color vector (w).

The gain of the operational amplifiers 22, 24, 26 and 28 is controllable in this case via negative feedback resistors 40, 42, 44, 56. Amplifiers whose gain can be adjusted via a voltage could be used instead; however, these are very costly at the high frequencies required in a video system. For this reason, a standard circuit via operational amplifiers and controllable resistors is preferred. Controllable resistors can be adjusted, e.g., via a magnetic field or heating means. However, the gains can also be controlled digitally when a circuit according to FIG. 5 is used for resistors 40, 42, 44, 56. The example shown in FIG. 5 is designed on 16 stages of resistor values corresponding to a 4-bit presentation for s. The controllable resistance according to FIG. 5 is formed by means of series-connected resistors 60, 62, 64, 66 and 68, wherein resistors 62, 64, 66 and 68 can be short-circuited via the drain-source junction of field-effect transistors 70, 72, 74, 76. Field-effect transistors of this type are obtainable as analog switches from Texas Instruments together with electronic driving means as integrated circuits by the following designations TL 182C, TL 185C, TL 188C or TL 191 C; although a substantial resistance of the drain-source junction of more than 100 Ω must be taken into account in calculating the resistances 62, 64, 66 and 68. However, circuits of this type can also be constructed conventionally. Therefore, it will be assumed hereinafter that the drain-source junction has a resistance of zero in the case of a short circuit and the resistance value in the blocked state is substantially greater than resistance 60. In this case, for a binary control such as that shown in the drawing by the inputs designated by 20, 21, 22, 23 for the respective value of a binary digit of a binary value, the resistance 64 is twice as great as resistance 64 and resistance 68 is twice as great as resistance 66. If it is desired to achieve saturation increases of 10%, for example, 10% of the value of resistance 60 must be selected for the sum of the resistance values of resistors 62, 64, 66 and 68.

Figure 5:
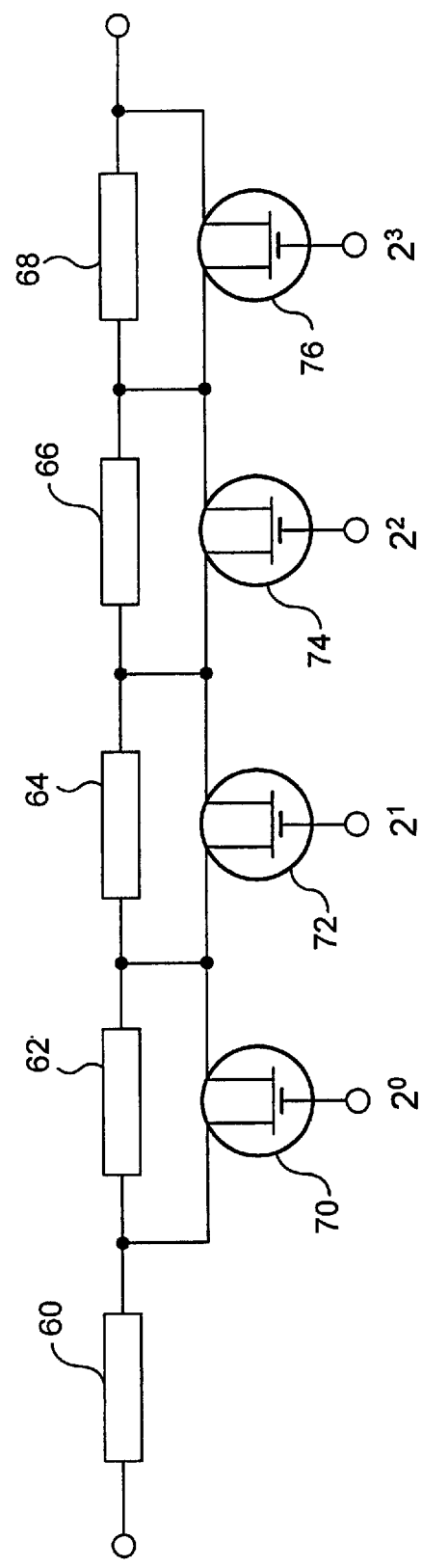
FIG. 5 shows a design for an electrically changeable resistor for use in the circuit according to FIG. 4 for adjusting saturation.
Figure 6:
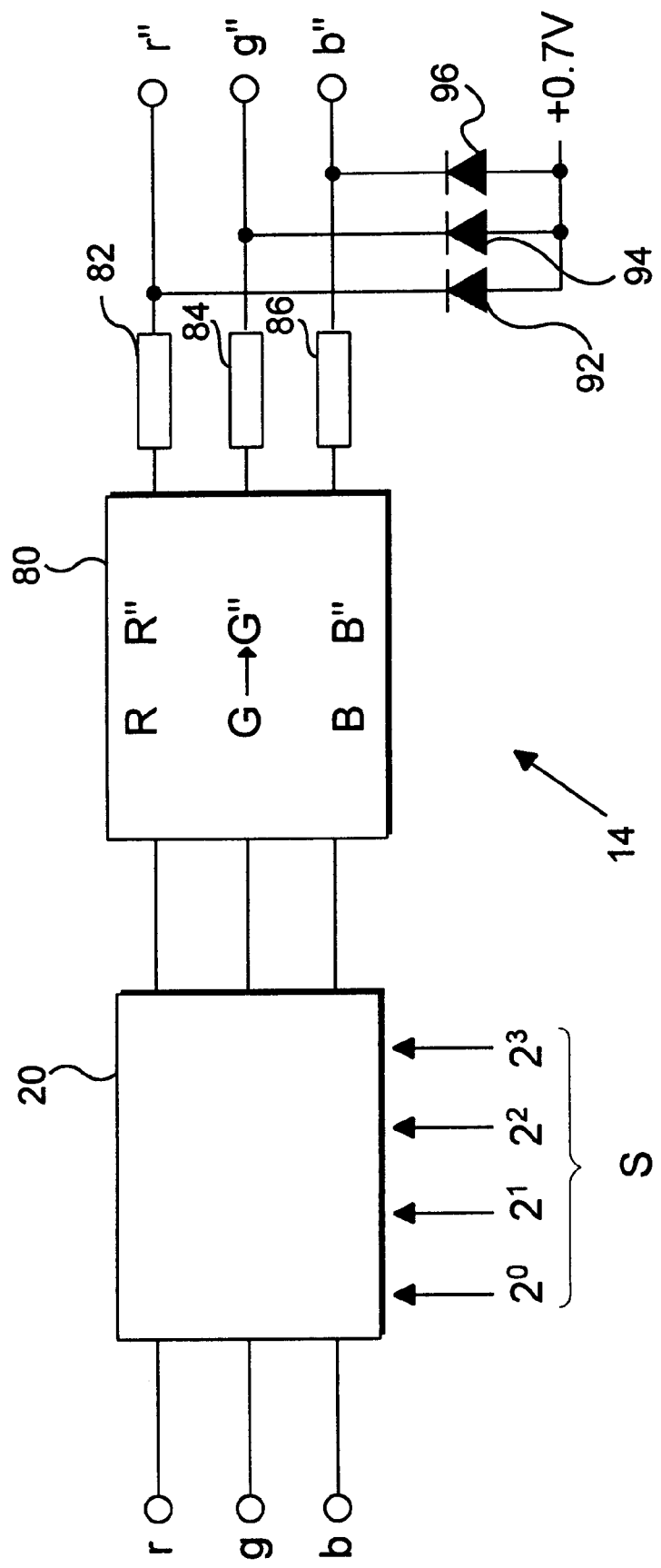
FIG. 6 shows an embodiment example for a changeable saturation of the colors of a video picture using the circuit according to FIG. 4.

With such low increases in saturation, since 1−1/S, S−1, the factor (1−1/S) for the operational amplifier 28 can also be easily controlled digitally by omitting the resistor 60 in the simulation of the resistor 56 based on the circuit of FIG. 5 (resistance value 0 Ω for resistor 60) and, further, by providing the controllable resistors 40, 42, 44 and selecting the values of resistors 30, 32, 34, 50, 52, 54 in FIG. 4 so as to be equal.

A circuit arrangement of the kind shown in FIGS. 4 and 5 permits an increase in the saturation in 16 stages, where the stages are connected by a digitally displayed binary value. This can be obtained, for example, from the voltage drop at the tap of a potentiometer via an analog-to-digital converter. The expansion of such circuits to more than 16 stages can be achieved in the same way by an appropriate circuit arrangement with more field-effect transistors and resistors. FIG. 6 shows how the circuit 20 according to FIG. 4 can be included in a matrix circuit 14. The signals for the color values r, g, b lie at the inputs of the circuit 20 whose factor S for the increase in saturation at the inputs designated by 20, 21, 22, 23 is determined as a binary value via logic signals. The signals converted by the circuit 20 in accordance with the equation indicated above are subsequently delivered to a matrix circuit 80 which is constructed in accordance with the prior art in such a way that color value signals of the input-side primaries (R, G, B) are transformed to color value signals of the image-side primaries (R", G", B") for color display in the image forming device 12. Further, the reversal of signs of the color value signals for the color values r, g, b in the matrix circuit is taken into account by the circuit 20. A suppressor circuit formed of a voltage divider which is formed in each instance by a resistor 82, 84, 86 and a diode 92, 94, 96 is provided at every output of the matrix circuit 80. These suppressor circuits suppress voltages of the wrong polarity which occur when the increase in saturation follows from the hue region of the hue region plotted by primaries (R", G", B"). This could be possible, e.g., with a very large S, as will be seen from the blue primary in FIG. 2 for which only a small saturation increase is possible due to the limited color stimulus specification region.

The diodes 92, 94, 96 are connected in this case to a counter-potential of 0.7 volts which is the threshold voltage of the silicon diodes 92, 94, 96 used in the embodiment example. The driving of the diodes 92, 94, 96 shown herein provides that the output signals of the matrix circuit 14 approach zero asymptotically and logarithmically at negative output signals of the matrix circuit 80. The onset of the logarithmic behavior is determined in a known manner by the design of the resistors 82, 84 and 86 in connection with the diode characteristics of the diodes 92, 94 and 96.

In the preceding, the process and the color video system was shown for three image-side primaries. Naturally, it is also possible to use more than three image-side primaries which are controlled by a suitable matrix. Then there is an even greater region for hue changes and saturation increases which can be carried out by means of the same process.

While the foregoing description and drawings represent the preferred embodiments of the present invention, it will be obvious to those skilled in the art that various changes and modifications may be made therein without departing from the true spirit and scope of the present invention.

What is claimed is:

1. In a process for the color transformation of the color stimulus specifications of image points of a color video system in which every color stimulus specification can be represented by components of a color vector within a color stimulus specification region which contains an achromatic point (w) and is determined by input-side primaries (R,G,B) of a signal source and in which image-side primaries (R", G",B",) whose color stimulus specification region likewise contains the achromatic point (w) are used for displaying the image points, wherein at least one color stimulus specification of this color stimulus specification region lies outside the color stimulus specification region of the input-side primaries (R,G,B) and a transformation is carried out for generating components referred to image-side primaries (R",G",B") and image-side components of negative intensity are suppressed at their occurrence, an improvement comprising the steps of:

setting up fictitious primaries (R',G',B') whose color stimulus specification region contains said at least one color stimulus specification outside the color stimulus specification region of the input-side primaries (R,G,B) and within the color stimulus specification region of the image-side primaries (R",G",B"), and transforming each color vector of the input-side primaries (R,G,B) to the corresponding fictitious primary (R',G',B').

carrying out the transformation by the following steps:
a) converting the components of the color vector from input-side primaries (R,G,B) to fictitious primaries (R',G',B') such that the color stimulus specification of at least one input-side primary (R,G,B) is shifted to the at least one color stimulus specification outside the color stimulus specification region of the input-side primaries (R,G,B), and
b) transforming the converted components of the color vector from the fictitious primaries (R',G',B') to the image-side primaries (R",G",B") for generating image-side components of a color vector, wherein the image-side color stimulus specifications produced in this way have the same hue and the same saturation as the transformed color stimulus specification in the fictitious primary system (R',G',B').

2. The process according to claim 1, wherein the color stimulus specification of the achromatic point (w) is not affected by the conversion into components of a color vector in the fictitious primary system (R', G', B').

3. The process according to claim 1, including the step of carrying out the conversion of the components of the color vector from the input-side primary system to the fictitious primary system (R',G',B') by matrix transformation of the components of the color vector.

4. The process according to claim 3, wherein only one individual matrix transformation is carried out with a matrix which is given by the product of the matrix used for conversion and a matrix for transformation from the fictitious primary system (R', G', B') to the image-side primary system (R", G", B").

5. The process according to claim 1, wherein the fictitious primaries (R', G', B') are fixed at color stimulus specifications which have the same hue as the input-side primaries (R G, B) but which have an increased saturation for at least one of the input-side primaries (R, G, B).

6. In a color video system for showing color image points with an input circle for generating and/or taking over color value signals associated with input-side primaries (R,G,B) for a color stimulus specification region containing achromatic point (w), with an image forming device for generating image points of color video picture based on image-side primaries (R",G",B") whose color stimulus specification region contains the achromatic point (w) and at least one color stimulus specification outside the color stimulus specification region of the input-side primaries (R,G,B), and a matrix circuit which is connected between the input circuit and the image forming device, an improvement comprising:

a circuit for converting color value signals referred to the input-side primaries into color value signals referred to fictitious primaries (R',G',B') whose color stimulus specification region contains the at least one color stimulus specification lying outside the color stimulus specification region of the input-side primaries and within the color stimulus specification region of the image-side primaries (R",G",B"), wherein the color value signals of at least one input-side primary (R,G,B) can be converted by said circuit to color value signals for the at least one color stimulus specification lying outside the color stimulus specification region of the input-side primaries (R,G,B), and said matrix circuit being designed for transformation of the color value signals referred to the fictitious primaries (R',G',B') into the image-side primaries (R",G",B").

7. The color system according to claim 6, wherein the circuit for converting the input-side color value signals to the fictitious primaries (R',G',B') is designed so that the color stimulus specification of the achromatic point (w) can be represented on the image side by input-side color stimulus specification.

8. The color video system according to claim 6, wherein said circuit for converting contains an additional matrix circuit for an additional matrix transformation.

9. The color video system according to claim 8, wherein the matrix circuit contains the circuit for the conversion in that it is designed for a matrix transformation with an individual transformation matrix which is the product of the matrix for the matrix transformation of the conversion and the matrix for the transformation of the color value signals from the fictitious primary system (R',G',B') to the image-side primaries (R", G",B").

10. The color video system according to claim 6, wherein the circuit for the conversion can be controlled for different selectable fictitious primaries (R',G',B').

11. The color video system according to claim 10, wherein the circuit has resistors which are controllable for different selectable fictitious primaries, which resistors can be changed by control voltages which can be applied to the circuit or currents which can be passed into the circuit.

12. The color video system according to claim 6, wherein suppressor circuits for negative image-side color value signals are provided, said suppressor circuits containing a voltage divider comprising a diode and a resistor for each color value signal, wherein the voltage divider is connected on the diode side to a potential compensating for the threshold voltages of the diodes.

* * * * *